United States Patent [19]
Hall

[11] Patent Number: 5,984,436
[45] Date of Patent: Nov. 16, 1999

[54] HYDRAULIC TRACK TENSIONING CIRCUIT

[75] Inventor: Lowell R. Hall, Elwood, Ill.

[73] Assignee: Caterpillar Inc., Peoria, Ill.

[21] Appl. No.: 08/994,243

[22] Filed: Dec. 19, 1997

[51] Int. Cl.$^6$ ............................................. B62D 55/14
[52] U.S. Cl. ........................ 305/145; 305/143; 305/144; 305/149
[58] Field of Search ................... 305/143, 144, 305/145, 149; 91/4 R

[56] References Cited

U.S. PATENT DOCUMENTS

| | | | |
|---|---|---|---|
| 2,998,998 | 9/1961 | Hyler et al. . | |
| 3,082,043 | 3/1963 | Orton . | |
| 3,310,127 | 3/1967 | Siber et al. | 305/144 |
| 3,549,213 | 12/1970 | Smith et al. . | |
| 3,647,270 | 3/1972 | Althaus | 305/10 |
| 3,901,563 | 8/1975 | Day | 305/10 |
| 3,910,649 | 10/1975 | Roskaft | 305/144 |
| 3,972,569 | 8/1976 | Bricknell | 305/144 |
| 4,078,681 | 3/1978 | Field, Jr. | 60/421 |
| 4,681,376 | 7/1987 | Riml | 305/10 |
| 4,819,754 | 4/1989 | Purcell et al. | 180/9.1 |
| 4,893,883 | 1/1990 | Satzler | 305/10 |
| 5,005,920 | 4/1991 | Kinsinger | 305/10 |
| 5,077,972 | 1/1992 | Bianchetta et al. | 60/427 |
| 5,165,765 | 11/1992 | Baylor | 305/144 |
| 5,334,106 | 8/1994 | Purcell | 474/110 |
| 5,378,204 | 1/1995 | Urvoy | 474/110 |
| 5,390,996 | 2/1995 | Bliss | 305/10 |
| 5,482,126 | 1/1996 | Bouit et al. | 180/9.1 |
| 5,738,421 | 4/1998 | Neymans et al. | 305/144 |

*Primary Examiner*—D. Glenn Dayoan
*Assistant Examiner*—Long Bao Nguyen
*Attorney, Agent, or Firm*—John W. Grant; Calvin E. Glastetter

[57] ABSTRACT

A hydraulic track tensioning circuit is connected to an idler wheel of a track drive mechanism to maintain a tension in a track proportional to the drawbar pull of the track drive mechanism. The tensioning circuit includes a variable pressure relief valve having a variable pressure setting controller which controls the tensioning pressure in a supply line connected to a hydraulic tensioning cylinder in response to the highest pressure in a pair of motor ports of a reversible hydraulic drive motor operative to propel the track drive mechanism.

8 Claims, 2 Drawing Sheets

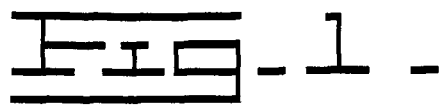
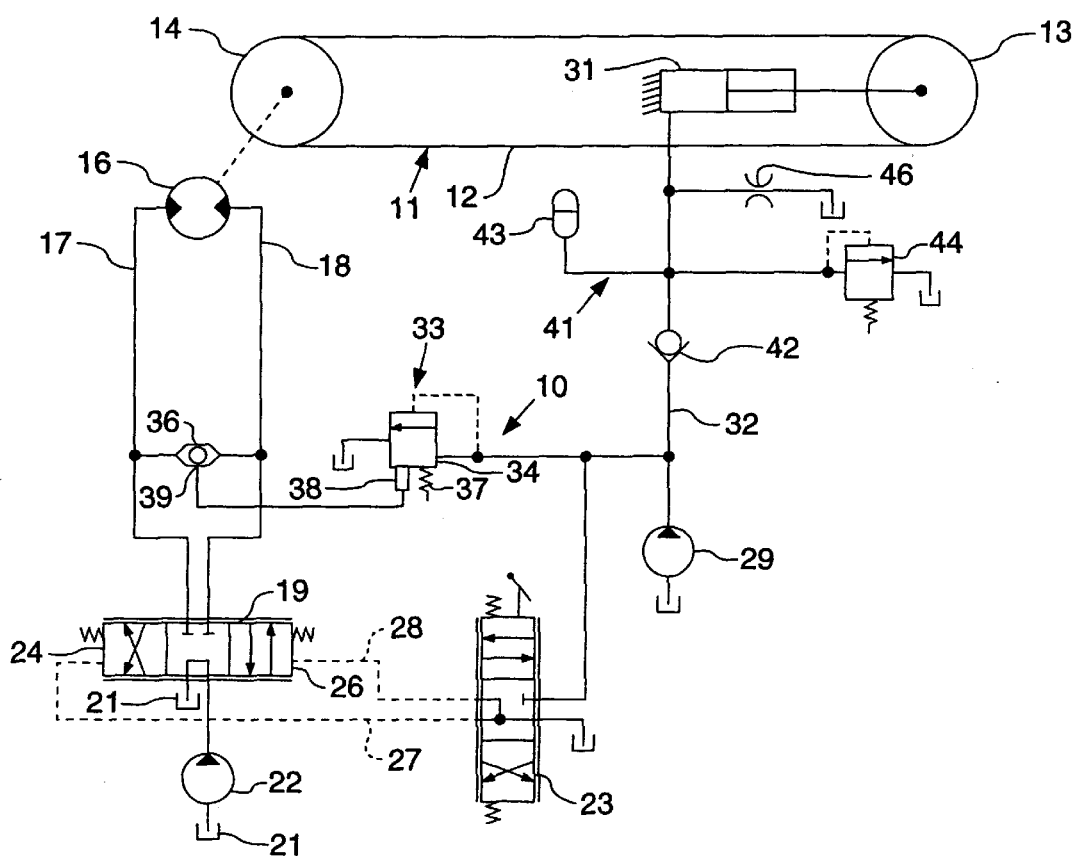

HYDRAULIC TRACK TENSIONING CIRCUIT

DESCRIPTION

1. Technical Field

This invention relates generally to a track tensioning circuit of a track drive system and more particularly to a hydraulic track tensioning circuit which adjusts the hydraulic tensioning pressure to maintain track tension proportional to the drawbar pull.

2. Background Art

Self-laying track-type machines utilize endless loop tracks entrained about drive and idler wheels to support and propel the machine. In order to operate efficiently, the tracks must be tensioned generally by biasing the idler wheel away from the drive wheel. Tensioning the tracks of some current large hydraulic excavators is done by maintaining a high hydraulic tensioning pressure in a hydraulic track tensioning cylinder with the high tensioning pressure and thus the track tension being determined by the maximum drawbar pull requirements of the excavator. One of the problems encountered with those excavators is that the tracks experience unusually high track and pin wear as a result of the high track tension being maintained even when the excavator is operated at drawbar pull levels less than maximum. Maintaining high tension in the track when the excavator is operated at less than maximum drawbar pull also consumes more power.

Since hydraulic excavators operate at maximum drawbar pull only a low percentage of the time, it would be desirable to provide a hydraulic track tensioning circuit which maintains the tensioning pressure and thus the track tension proportional to the drawbar pull imposed on the tracks.

The present invention is directed to overcoming one or more of the problems set forth above.

DISCLOSURE OF THE INVENTION

In one aspect of the present invention, a hydraulic track tensioning circuit is provided for adjustably controlling tension in an endless loop track entrained about an idler wheel and a drive wheel of a track drive mechanism which includes a reversible hydraulic drive motor that is drivingly connected to the drive wheel and has a pair of motor ports. The hydraulic track tensioning circuit comprises a source of pressurized fluid, a hydraulic tensioning cylinder connected to one of the wheels to move the one wheel in a direction to increase tension in the track proportional to the pressure of fluid in the tensioning cylinder, a supply line communicating fluid from the source of fluid to the tensioning cylinder, and a variable pressure relief valve means connected to the supply line for controlling the fluid pressure in the supply line proportional to the pressure of fluid in one of the motor ports.

BRIEF DESCRIPTION OF THE DRAWINGS

FIG. 1 is a diagrammatic schematic illustration of an embodiment of the present invention;

BEST MODE FOR CARRYING OUT THE INVENTION

Figure 2:
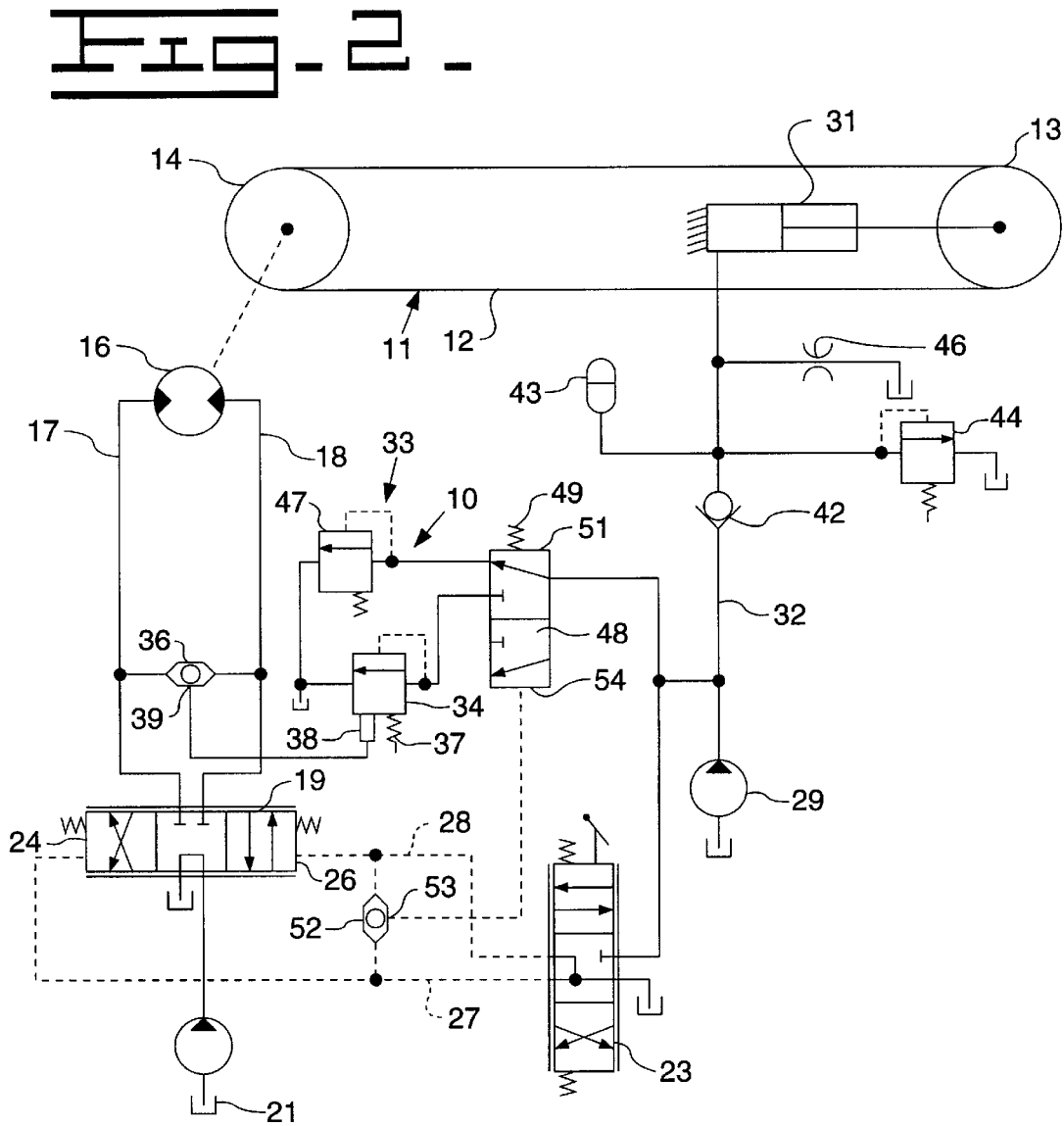
FIG. 2 is a diagrammatic schematic illustration of another embodiment of the present invention.

Referring to the drawings, a hydraulic track tensioning circuit 10 is shown in combination with a track drive mechanism 11. The track drive mechanism 11 includes an endless loop track 12 entrained about an idler wheel 13 and a drive wheel 14, a reversible hydraulic motor 16 drivingly connected to the drive wheel 14 and having a pair of inlet/outlet motor ports 17,18, a pilot operated directional control valve 19 connected to the motor ports 17,18 and to a hydraulic tank 21, and a hydraulic pump 22 connected to the control valve 19 and the tank 21. A pilot control valve 23 is connected to opposite ends 24,26 of the control valve through a pair of pilot lines 27,28 and to a source of pressurized hydraulic fluid such as a pilot pump 29.

The hydraulic track tensioning circuit 11 includes a hydraulic tensioning cylinder 31 connected to the idler wheel 13 to move the idler wheel in a direction to increase tension in the track 12 when pressurized fluid is supplied thereto. A tensioning pressure supply line 32 connects the pilot pump 29 to the tensioning cylinder 31 for supplying the pressurized fluid to the tensioning cylinder. A variable pressure relief valve means 33 is connected to the supply line 32 and the tank 21 for controlling the fluid pressure in the supply line 32 and thus in the tensioning cylinder 31 proportional to the pressure of fluid in one the motor ports 17 or 18. The valve means 33 in this embodiment can be for example a variable pressure relief valve 34 disposed between the supply line 32 and the tank and a resolver 36 disposed between and connected to the motor ports 17 and 18 for communicating the highest fluid pressure in the motor ports to the relief valve 34. The relief valve is biased to the closed position by a spring 37 and a variable pressure setting controller 38 connected to an output 39 of the resolver 36 and is moved to its open position when the pressure in the supply line 32 exceeds the combined biasing forces of the spring and the pressure setting controller.

Figure 3:
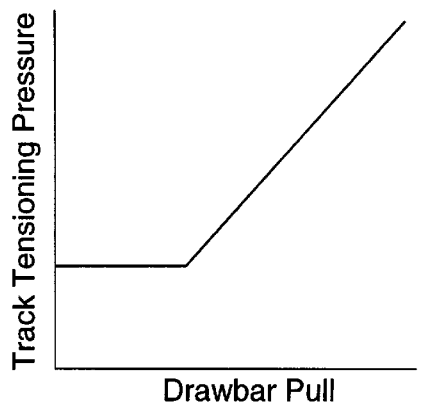
FIG. 3 is a graph illustrating certain operating characteristics of the present invention.

The force of the spring 37 of the relief valve 34 is selected to maintain the track tensioning pressure in the tensioning cylinder 31 at a minimum level even when no pressure exists in the motor ports 17,18 or when the highest pressure in the motor ports is below a predetermined level. The minimum track tensioning pressure is maintained until the highest pressure in the motor ports reaches a predetermined level so that a preselected relationship between the track tensioning pressure and the drawbar pull is maintained as shown by the graph FIG. 3.

A recoil system 41 is provided to permit the tensioning cylinder 31 to retract when tension in the track 12 exceeds a predetermined tension. The recoil system includes a check valve 42 disposed in the supply line 32, a high pressure accumulator 43 connected to the tensioning cylinder and a high pressure relief valve 44 connected to the tensioning cylinder and the tank. A bleed orifice 46 is also connected to the tensioning cylinder to provide restricted flow from the tensioning cylinder to the tank.

FIG. 2 discloses another embodiment of the hydraulic track tensioning circuit 11 and utilizes the same reference numerals to designate similarly constructed counterpart elements as identified in the embodiment of FIG. 1. In this embodiment, the variable pressure relief valve means 33 includes a fixed low pressure relief valve 47 connected in parallel to the variable pressure relief valve 34, a pilot operated shuttle valve 48 disposed between the supply line 32 and the relief valves 34 and 47 and having a spring 49 disposed at one end 51 to bias the shuttle valve 48 to the operating position shown, and a resolver 52 disposed between and connected to the pilot lines 27 and 28 and having an output 53 communicating the highest pilot pressure in the pilot lines to the other end 54 of shuttle valve.

Industrial Applicability

In use of the embodiment of FIG. 1, clockwise rotation of the drive wheel 14 for driving the track 12 to propel the machine in a forward direction is initiated by upward movement of the pilot valve 23. At this position, the pilot valve directs pilot pressure through the pilot line 28 for shifting the control valve 19 leftward to an operating position directing fluid from the pump 22 to the hydraulic motor 16 through the motor port 17. Similarly, downward movement of the pilot valve 23 results in fluid being directed from the pump through the motor port 18 for counterclockwise rotation of the drive wheel to propel the machine in a reverse direction. The fluid pressure required in the motor ports 17,18 of the hydraulic motor for driving the track 12 is typically proportional to the drawbar pull required to propel the machine.

The resolver 36 detects when pressurized fluid is being directed through either of the motor ports 17 or 18 and communicates the highest pressure in the motor ports through the output 39 to the pressure setting controller 38 of the variable pressure relief valve 34. When the highest pressure in the motor ports exceeds the predetermined level, the pressure setting controller actively starts to increase the pressure setting of the variable pressure relief valve. The pressure setting is thereafter determined by the level of the highest pressure in the motor ports 17 or 18 so that the track tensioning pressure in the supply line 32 and the tensioning cylinder 31 is proportional to the level of the highest pressure in the motor ports. Since the fluid pressure in the motor ports 17,18 for driving the track 12 is proportional to drawbar pull required to propel the machine, the tension in the track is maintained proportional to drawbar pull.

In the FIG. 2 embodiment, the shuttle valve 48 is normally biased to the position shown when the piolt valve 23 is in its neutral position shown such that neither pilot line 27 or 28 is pressurized. The supply line 32 thus communicates with the relief valve 47 to maintain the pressure in the supply line 32 at a minimum level to thereby maintain the predetermined minimum tension in the track. As noted above, moving the pilot valve in either direction directs pressurized pilot fluid through the appropriate one of the pilot lines 27 or 28 to cause pressurized fluid to be directed through the appropriate one of the motor ports 17 or 18. Pressurized pilot fluid in either pilot line is communicated to the shuttle valve 48 causing the shuttle valve to move upward to communicate the supply line 32 with the variable pressure relief valve 34 so that the tensioning pressure in the tensioning cylinder is controlled by the variable pressure relief valve. The highest pressure in the motor ports is communicated by the resolver 36 to the pressure setting controller 38 of the variable pressure relief valve so that the variable pressure relief valve maintains the tensioning pressure in the tensioning cylinder proportional to the drawbar pull once the highest pressure in the motor ports reaches the predetermined level similar to that described above.

A recoil function is provided in both embodiments by the accumulator 43 and the relief valve 44. The accumulator acts as a spring and takes in fluid expelled from the tensioning cylinder when the track tension exceeds the predetermined tension permitting the tensioning cylinder to retract. The relief valve 44 relieves high pressure spikes generated in the tensioning cylinder.

In view of the above, it is readily apparent that the structure of the present invention provides an improved hydraulic track tensioning circuit for maintaining tension in the track proportional to the drawbar pull of a track drive mechanism. This is accomplished by the use of a variable pressure relief valve for controlling the track tensioning pressure in the hydraulic tensioning cylinder with the pressure setting of the variable pressure relief valve being controlled by a pressure setting controller in response to the highest pressure in the motor ports of the hydraulic drive motor driving the track.

Other aspects, objects and advantages of this invention can be obtained from a study of the drawings, the disclosure and the appended claims.

I claim:

1. A hydraulic track tensioning circuit for adjustably controlling tension in an endless loop track entrained about an idler wheel and a drive wheel of a track drive mechanism which includes a reversible hydraulic drive motor drivingly connected to the drive wheel and having a pair of motor ports, the hydraulic track tensioning circuit comprising:

a source of pressurized fluid;

a hydraulic tensioning cylinder connected to one of the wheels to move the one wheel in a direction to increase tension in the track proportional to the pressure of fluid supplied to the tensioning cylinder;

a supply line directing fluid from the source of pressurized fluid to the tensioning cylinder; and a variable pressure relief valve means connected to the supply line for controlling the fluid pressure in the supply line proportional to the pressure of fluid in one of the motor ports.

2. The hydraulic track tensioning circuit of claim 1 wherein the variable pressure relief valve means includes a variable pressure relief valve connected to the supply line and having a pressure setting controller.

3. The hydraulic track tensioning circuit of claim 2 wherein the variable pressure relief valve means includes a resolver for communicating the highest pressure in the motor ports to the pressure setting controller.

4. The hydraulic track tensioning circuit of claim 3 wherein the variable pressure relief valve means includes a fixed pressure relief valve connected in parallel to the variable pressure relief valve and a pilot operated shuttle valve disposed between the supply line and the relief valves.

5. The hydraulic track tensioning circuit of claim 4 including a pilot operated control valve connected to the pair of motor ports, a pilot control valve, a pair of pilot lines connecting the pilot control valve to the pilot operated control valve and a resolver connected to the pilot lines and communicating the highest pilot pressure in the pilot lines to the shuttle valve.

6. The hydraulic track tensioning circuit of claim 3 including a check valve disposed in the supply line and an accumulator connected to the tensioning cylinder.

7. The hydraulic track tensioning circuit of claim 6 including a relief valve connected to the tensioning cylinder.

8. A hydraulic track tensioning circuit for adjustably controlling tension in an endless loop track entrained about an idler wheel and a drive wheel of a track drive mechanism which includes a reversible hydraulic drive motor drivingly connected to the drive wheel and having a pair of motor ports, the hydraulic track tensioning circuit comprising:

a source of pressurized fluid;

a hydraulic tensioning cylinder connected to one of the wheels to move the one wheel in a direction to increase tension in the track proportional to the pressure of fluid supplied to the tensioning cylinder;

a supply line directing fluid from the source of pressurized fluid to the tensioning cylinder;

a variable pressure relief valve means connected to the supply line for controlling the fluid pressure in the supply line proportional to the pressure of fluid in one of the motor ports, the variable relief valve means includes a variable pressure relief valve having a pressure setting controller;

a resolver for communicating the highest pressure in the motor ports to the pressure setting controller; and a fixed pressure relief valve connected in parallel to the variable pressure relief valve and a pilot operated shuttle valve disposed between the supply and the relief valves.

* * * * *